(12) United States Patent
Jang et al.

(10) Patent No.: US 7,015,980 B2
(45) Date of Patent: Mar. 21, 2006

(54) COLOR TEMPERATURE CONVERSION APPARATUS IN COLOR DISPLAY SYSTEM AND METHOD THEREOF

(75) Inventors: Guen-sik Jang, Suwon (KR); Bong-soon Kang, Busan (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 394 days.

(21) Appl. No.: 10/061,261

(22) Filed: Feb. 4, 2002

(65) Prior Publication Data

US 2002/0164072 A1    Nov. 7, 2002

(30) Foreign Application Priority Data

Feb. 24, 2001    (KR) ............................... 2001-9482

(51) Int. Cl.
*H04N 9/73*    (2006.01)
(52) U.S. Cl. .................... 348/655; 348/656; 348/223.1
(58) Field of Classification Search ............... 348/655, 348/656, 223.1; 345/589–591; 382/167
See application file for complete search history.

(56) References Cited

U.S. PATENT DOCUMENTS 5,016,091 A * 5/1991 Choi ....................... 348/224.1
5,168,155 A * 12/1992 Arima et al. ............... 250/226
6,118,455 A    9/2000 Hidaka et al.
6,522,313 B1 * 2/2003 Cottone ....................... 345/22
6,560,358 B1 * 5/2003 Tsukada ..................... 382/167
6,594,384 B1 * 7/2003 Kim et al. .................. 382/162
6,677,958 B1 * 1/2004 Cottone et al. ............. 345/589

FOREIGN PATENT DOCUMENTS

EP    0 891 077 A2    1/1999
JP    10-322566 A    12/1998

\* cited by examiner

*Primary Examiner*—Victor R. Kostak
(74) *Attorney, Agent, or Firm*—Sughrue Mion, PLLC

(57) ABSTRACT

An apparatus for converting color temperature in a color display system, and a method thereof. A first color temperature converting factor unit has a first color temperature converting factors for converting a first predetermined color temperature to a particular color temperature, and a second color temperature converting factor unit has a first color temperature converting factors for converting the particular color temperature to a second predetermined color temperature. A color temperature converting factor creating unit makes a color temperature converting factor for converting an input color temperature to an aiming color temperature based on a first converting factor selected from the first color temperature converting factors according to the input color temperature and based on a second converting factor selected from the second color temperature converting factors according to the input aiming color temperature.

8 Claims, 5 Drawing Sheets

COLOR TEMPERATURE CONVERSION APPARATUS IN COLOR DISPLAY SYSTEM AND METHOD THEREOF

BACKGROUND OF THE INVENTION

1. Field of the Invention

The present invention relates to an apparatus for converting color temperature in a color display system and a method thereof, and more particularly to an apparatus for converting color temperature by creating converting factors with a plurality of factor portions to convert a predetermined input color temperature into a predetermined aiming color temperature, and a method thereof.

2. Description of the Related Art

A person generally perceives that color tone varies based on an illumination characteristic, when the person sees something. In other words, while one may perceive that the color tone of something under an incandescent lamp is generally reddish, it is comparatively bluish in daylight. Therefore, in a color display system, there is a need to change the color of an object input in the system, to a color that a person sees. The color tone that is generally shown relates to a color temperature. The color temperature means a temperature of a black body when the color of light sources is the same, measured in unit Kelvin [K]. If the color temperature is high, then it is bluish. If the color temperature is low, then it is reddish.

The color display system is broadly used for apparatuses that need to transmit visual information to a user. The apparatuses include, for example, a TV, a digital TV, a TFT (Thin Film Transistor) monitor, a color printer, a digital camera, a projector, a mobile phone, and so on. The color temperature should be adjusted for improving the quality of a picture in the color display system.

Color models are a RGB (red, green, blue) model, a Hue, Saturation, Brightness/Hue, Lightness, Saturation (HSB/HLS) model, a Munsell color system, and a Commission Internationale de l'Eclairage, or CIE, color model. The CIE color model is decided at International Commission on illumination, which defines lighting standards. The CIE color model includes a CIEXYZ, a CIELTV, and a CIELAB. The CIEXYZ color model expresses RGB values as a set, X, Y, Z, of different values, all having positive signs. Generally, the X, Y, Z are called tri-stimulus.

A conventional method of converting the color temperature uses the CIEXYZ color model, and more particularly, it is a color temperature conversion method using both the X-axis and Y-axis.

Figure 1:
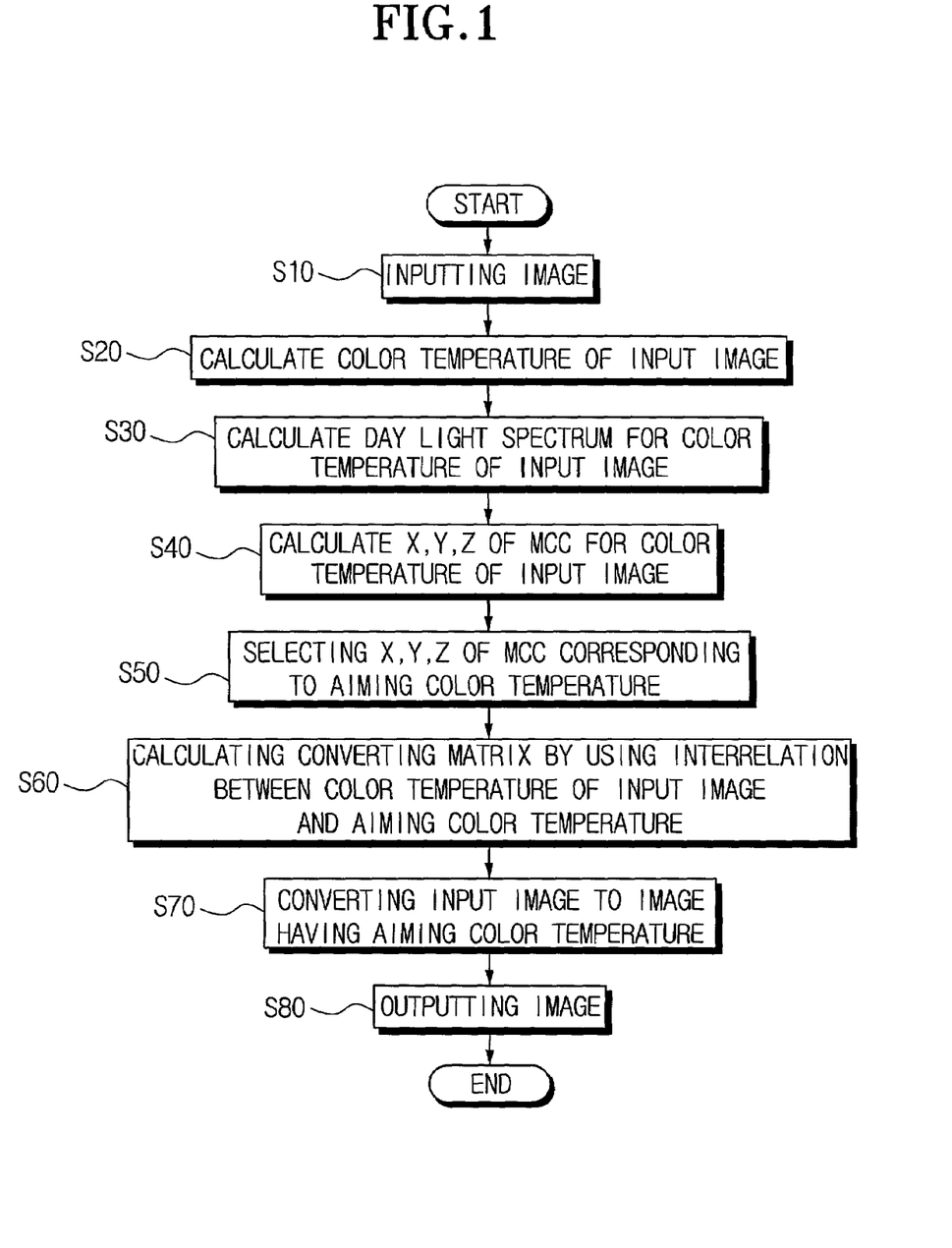
FIG. 1 is a flow chart for describing a method of converting a conventional color temperature.

From now on, the conventional color temperature conversion method will be described by referring to FIG. 1.

A detailed procedure of the conventional color temperature conversion method has been described on "Color Science: concepts and methods, quantitative data and formula, $2^{nd}$ edition, pp.145–146, 1982" by Gunter Wyszeck and W. S. Stiles. According to the conventional color temperature conversion method, when an image is input (S10), the color temperature Tc of the input image is calculated (S20). Then, a daylight spectrum related to the color temperature Tc of the calculated input image is calculated (S30). The daylight spectrum is calculated by following mathematical expressions 1) and 2) in accordance with a range of the color temperature Tc of the input image. 1) The color temperature Tc of the input image within a range of 4000K≦Tc<7000K is calculated by, $$X_D = -4.067\frac{10^9}{T_C^3} + 2.9678\frac{10^6}{T_C^2} + 0.09911\frac{10^3}{T_C} + 0.244063$$ [Mathematical Expression 1]

2) The color temperature Tc of the input image within a range of 7000K≦Tc<25000K is calculated by, $$X_D = -2.0064\frac{10^9}{T_C^3} + 1.9018\frac{10^6}{T_C^2} + 0.24748\frac{10^3}{T_C} + 0.237040$$ [Mathematical Expression 2]

$$Y_D = -3X_D^2 + 2.87X_D - 0.275$$

A spectrum radiant power distribution $S_D(\lambda)$ of the daylight is calculated by, $$S_D(\lambda) = S_0(\lambda) + M_1 S_1(\lambda) + M_2 S_2(\lambda)$$ [Mathematical Expression 3]

where, $[S_0(\lambda), S_1(\lambda), S_2(\lambda)]$ correspond to $[s0[31], s1[31], s2[31]]$, and $s0[31], s1[31], s2[31]$ are fixed values, while $$M1 = \frac{-1.3515 - 1.7703x_D + 5.9114y_D}{0.0241 + 0.2562x_D - 0.7341y_D}$$

$$M2 = \frac{0.0300 - 31.4424x_D + 30.0717y_D}{0.0241 + 0.2562x_D - 0.7341y_D}$$

X, Y, Z of a Macbeth color checker (MCC) is calculated (S40). The MCC obtains the X, Y, Z of each path from the following mathematical expression 4. At this time, the applied MCC has thirty-one (31) elements when a wavelength (λ) is 400 nm to 700 nm. The interval of each element is 10 nm.

$$\begin{bmatrix} X_i^{ME} \\ Y_i^{ME} \\ Z_i^{ME} \end{bmatrix}_{3\times 1} = \begin{bmatrix} \bar{x}[i] \\ \bar{y}[i] \\ \bar{z}[i] \end{bmatrix}_{3\times 31} [R[i]]_{31\times 31} [E[i]]_{31\times 1}$$ [Mathematical Expression 4]

where, i=1, 2, ..., 31, and $\begin{bmatrix} \bar{x}[i] \\ \bar{y}[i] \\ \bar{z}[i] \end{bmatrix}_{3\times 31}$ is the function value of color matching, and $[R[i]]_{31\times 31}$ is a refeltance diagonal matrix related to one color path, and each wavelength band value exists only in the diagonal term of the matrix. Off-diagonal terms are all zero, and $[E[i]]_{31\times 1}$ is a spectrum power dispersion of the illumination.

$X_i^{ME}, Y_i^{ME}$, and $Z_i^{ME}$ are MCC tri-stimulus values related to the color temperature Tc of the input image.

The X, Y, Z of the MCC of aiming color temperature is selected (S50).

A converting matrix is calculated (S60) according to the following mathematical expression 5, using correlation of the color temperature Tc of the input image and the aiming color temperature.

$$[TM]_{3\times3} = [(XYZ)^{MT}]^{-1}_{3\times24} [(XYZ)^{ME}]_{3\times24}$$

[Mathematical Expression 5]

where, $[TM]_{3\times24}$ is a converting matrix, and $[(XYZ)^{MT}]^{-1}_{3\times24}$ is a matrix of MCC tri-stimulus values related to the aiming color temperature, and $[(XYZ)^{ME}]_{3\times24}$ is a matrix of MCC tri-stimulus values related to the color temperature Tc of the input image.

The input image is converted to an image of the aiming color temperature (S70). In other words, it is converted to an image of an aiming illumination by using the calculated converting matrix.

$$\begin{bmatrix} X_t \\ Y_t \\ Z_t \end{bmatrix} = [TM] \begin{bmatrix} X \\ Y \\ Z \end{bmatrix}$$

[Mathematical Expression 6]

where, Xt, Yt and Zt are the tri-stimulus elements according to the aiming color temperature, and

[TM] is the converting matrix, and

X, Y and Z are the tri-stimulus elements according to the color temperature Tc of the input image.

As described above, the image that is converted to the aiming color temperature is output (S80) to various color display apparatuses.

In the conventional color temperature conversion method, as described above, the tri-stimulus values X, Y, Z of the MCC related to the color temperature Tc of the input image and the tri-stimulus values X, Y, Z related to the aiming color temperature, should be calculated to draw out the color temperature converting matrix. The number of matrices needed to realize the conventional color temperature conversion method in hardware is shown in table one.

TABLE 1

| Type of Matrix | Number Needed |
|---|---|
| 31 × 1 | 3 |
| 24 × 31 | 1 |
| 3 × 31 | 1 |
| 24 × 3 | 1 |

Also, a matrix converting part is needed to write out the converting matrix. In addition, a plurality of multipliers and dividers are needed for calculating the above mathematical expressions. Therefore, applying the conventional color temperature Tc conversion method in hardware generates a problem of low utility in terms of magnitude and costs.

SUMMARY OF THE INVENTION

The present invention has been made to overcome the above-mentioned problems of the related art. Accordingly, it is an object of the present invention to provide a method of creating a converting matrix and an apparatus thereof, capable of converting a predetermined input color temperature to another predetermined color temperature.

Another object of the present invention is to provide a color temperature conversion apparatus and a method thereof, which can be easily implemented in hardware.

According to the present invention, the color temperature convert method for accomplishing the above object, converts a predetermined input color temperature to a predetermined aiming color temperature by being mediated by a particular color temperature.

An apparatus for creating a color temperature converting factor according to the present invention, comprises a first color temperature converting factor unit for storing a plurality of first color temperature converting factors for converting a first predetermined color temperature to a particular color temperature; a second color temperature converting factor unit for storing a plurality of second color temperature converting factors for converting the particular color temperature to a second predetermined color temperature; and a converting factor creating unit that makes a third color temperature converting factor for converting the input color temperature to the aiming color temperature based on a first converting factor selected from the first color temperature factors based on the input color temperature and a second converting factor selected from the second color temperature converting factors based on the input aiming color temperature.

An apparatus for converting a color temperature according to the present invention comprises a color temperature detecting unit for detecting a color temperature from an input image; a first color temperature converting factor unit for storing a plurality of first color temperature converting factors for converting a first predetermined color temperature to a particular color temperature; a second color temperature converting factor unit for storing a plurality of second color temperature converting factors for converting the particular color temperature to a second predetermined color temperature; a converting factor creating unit that makes a third color temperature converting factor for converting the input color temperature to the aiming color temperature according to a first converting factor selected from the first color temperature converting factors based on the input color temperature and a second converting factor selected from the second color temperature converting factors based on the input aiming color temperature.

A method for color converting a temperature according to the present invention comprises the steps of detecting a color temperature from an input image; inputting an aiming color temperature; selecting a first converting factor corresponding to the detected color temperature from first color temperature converting factors, for converting a first predetermined color temperature to a particular color temperature; selecting a second converting factor corresponding to the aiming color temperature from second color temperature converting factors for converting the particular color temperature to a second predetermined color temperature; creating a third color temperature converting factor for converting the input color temperature to the aiming color temperature by the selected first and second converting factors; and converting the color temperature of the input image to the aiming color temperature by the third color temperature converting factor.

A color display system according to the present invention includes a color temperature detecting unit for detecting a color temperature from an input image; a first color temperature converting factor unit for storing a plurality of first color temperature converting factors for converting a first predetermined color temperature to a particular color temperature; a second color temperature converting factor unit for storing a plurality of second color temperature converting factors for converting the particular color temperature to a second predetermined color temperature; a color temperature converting factor creating unit for creating a third color temperature converting factor for converting the input color temperature to the aiming color temperature according to a first converting factor selected from the first color temperature converting factors based on the detected color temperature and a second converting factor selected from the second color temperature converting factors based on the input aiming color temperature; a color temperature converting unit for converting the color temperature of the input image to the input aiming color temperature according to the third color temperature converting factor; and a display unit for displaying the image with the converted color temperature.

A color display method according to the present invention comprises the steps of detecting a color temperature from an input image; inputting an aiming color temperature; selecting a first converting factor corresponding to the detected color temperature from first color temperature converting factors, for converting a first predetermined color temperature to a particular color temperature; selecting a second converting factor corresponding to the aiming color temperature from second color temperature converting factors, for converting the particular color temperature to a second predetermined color temperature; creating a third color temperature converting factor for converting the input color temperature to the aiming color temperature according to the selected first and second converting factors; converting the color temperature of the input image to the aiming color temperature according to the third color temperature converting factor; and displaying the image with the converted color temperature.

According to a color temperature calculating apparatus of the color indication system and the method thereof, according to the present invention, since factors for converting an input color temperature to an aiming color temperature by intervening a particular color temperature are defined in advance, complications involving hardware construction can be reduced.

DESCRIPTION OF THE PREFERRED EMBODIMENT

From now on, the preferred embodiment of the present invention will be described in great detail by referring to the appended drawings.

Figure 2:
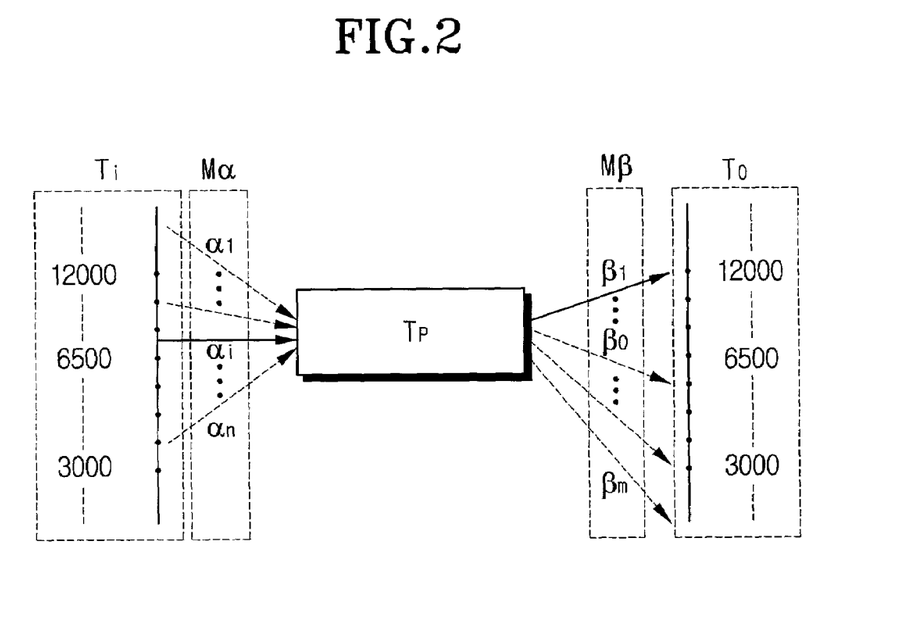
FIG. 2 is a view showing the concept of color temperature conversion according to the present invention.

Referring to FIG. 2, a principle objective of an apparatus for converting a color temperature and a method thereof, according to the present invention, is to convert a predetermined input color temperature Ti to a predetermined aiming color temperature To by being mediated by a particular color temperature Tp. At one end, a table Mα of first factors for converting the predetermined color temperature Ti to the particular color temperature Tp, is obtained. The table Mα contains the first factors indicated as $\alpha_1$ to $\alpha_i$ and $\alpha_i$ to $\alpha_n$, which converts the predetermined color temperature Ti to the particular color temperature Tp. Each factor is in the form of a 3×3 matrix. In addition, a table Mβ of second factors for converting the particular color temperature Tp to the predetermined color temperature To is also obtained. The table Mβ contains the second factors indicated as $\beta_1$ to $\beta_0$ and $\beta_0$ to $\beta_m$ for converting the particular color temperature Tp to the predetermined color temperature To. Each factor is in the form of a 3×3 matrix.

The tables Mα and Mβ can be obtained with a known method by using the MCC. For example, in the case of converting an input color temperature Ti of 6500K to an aiming color temperature To of 12000K, the input of the color temperature conversion apparatus is the input color temperature Ti of 6500K and the aiming color temperature To of 12000K. The apparatus for converting the color temperature can select the first converting factor $\alpha_i$ selected from the table Max based on the input color temperature Ti of 6500K, and the second converting factor $\beta_0$ can be selected from the table Mβ based on the aiming color temperature To of 12000K. Therefore, the color temperature converting factor for converting the input color temperature Ti of 6500K to the aiming color temperature To of 12000K, is obtained by multiplying the first converting factor $\alpha_i$ and the second converting factor $\beta_0$.

As described above, if the input color temperature Ti is converted to the aiming color temperature To by being mediated by the particular color temperature Tp, the construction of hardware becomes simpler.

Figure 3:
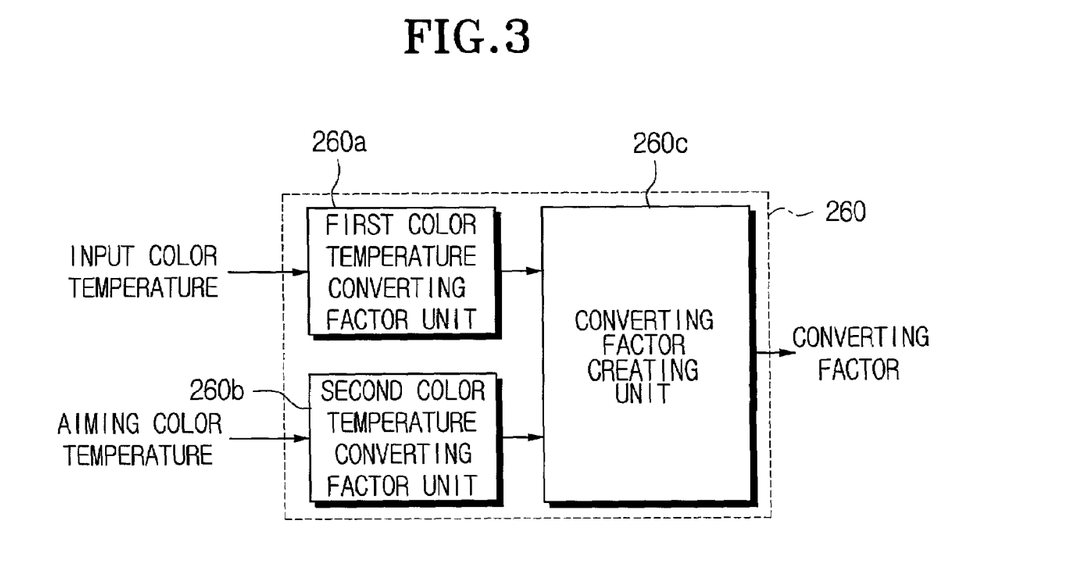
FIG. 3 is a block diagram showing a color temperature converting factor creating unit based on FIG. 2.
Figure 4:
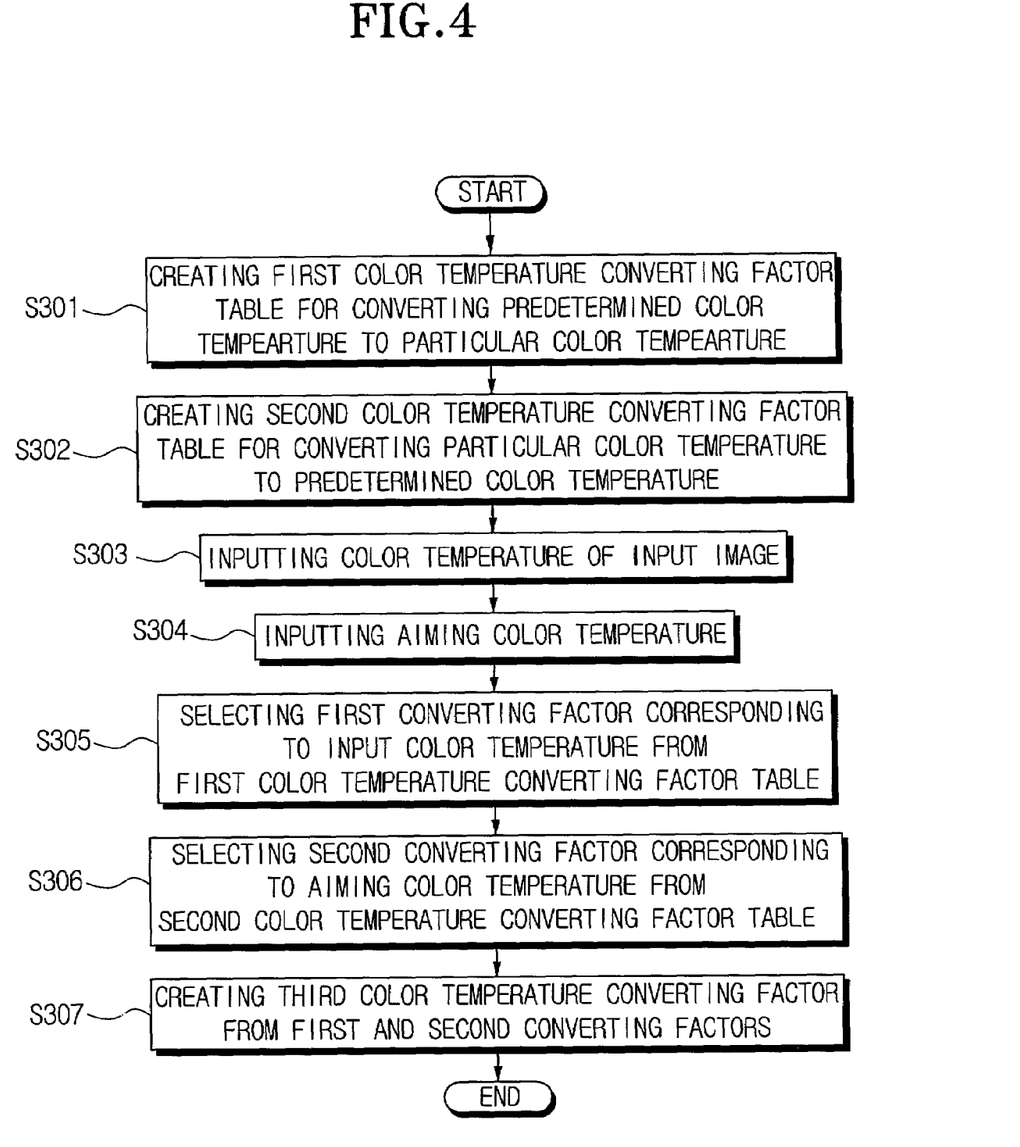
FIG. 4 is a flow chart showing a method of creating the color temperature converting factor applied in FIG. 3.

From now on, an apparatus for creating the color temperature converting factor and the method thereof according to the present invention will be described by referring to FIGS. 3 and 4.

An apparatus for creating the color temperature converting factor 260 according to the present invention includes a first color temperature converting factor unit 260a, a second color temperature converting factor unit 260b, and a converting factor creating unit 260c. The first color temperature converting factor unit 260a has the factors defined in advance for converting the color temperature Ti of the input image to the particular color temperature Tp. The second color temperature converting factor unit 260b has the factors defined in advance for converting the particular color temperature Tp to the aiming color temperature To. The converting factor creating unit 260c creates a third color temperature converting factor for converting the input color temperature Ti to the aiming color temperature To based on the first converting factor selected from the factors in the first color temperature converting factor unit 260a and the second converting factor selected from the factors in the second color temperature converting factor unit 260b.

The method of creating the color temperature converting factor according to the present invention is performed by following steps.

First of all, the first color temperature converting factors for converting the predetermined color temperature to the particular color temperature are obtained (S301). Then, the second color temperature converting factors for converting the particular color temperature to the predetermined color temperature are obtained (S302). The color temperature Ti of the input image is input (S303). Next, the aiming color temperature is input (S304). The first converting factor corresponding to the color temperature Ti of the input image is selected from the first color temperature converting factors (S305). The second converting factor corresponding to the input aiming color temperature is selected from the second color temperature converting factors (S306). The third color temperature converting factor for converting the input color temperature to the aiming color temperature based on the selected first and second converting factors, are created (S307).

Figure 5:
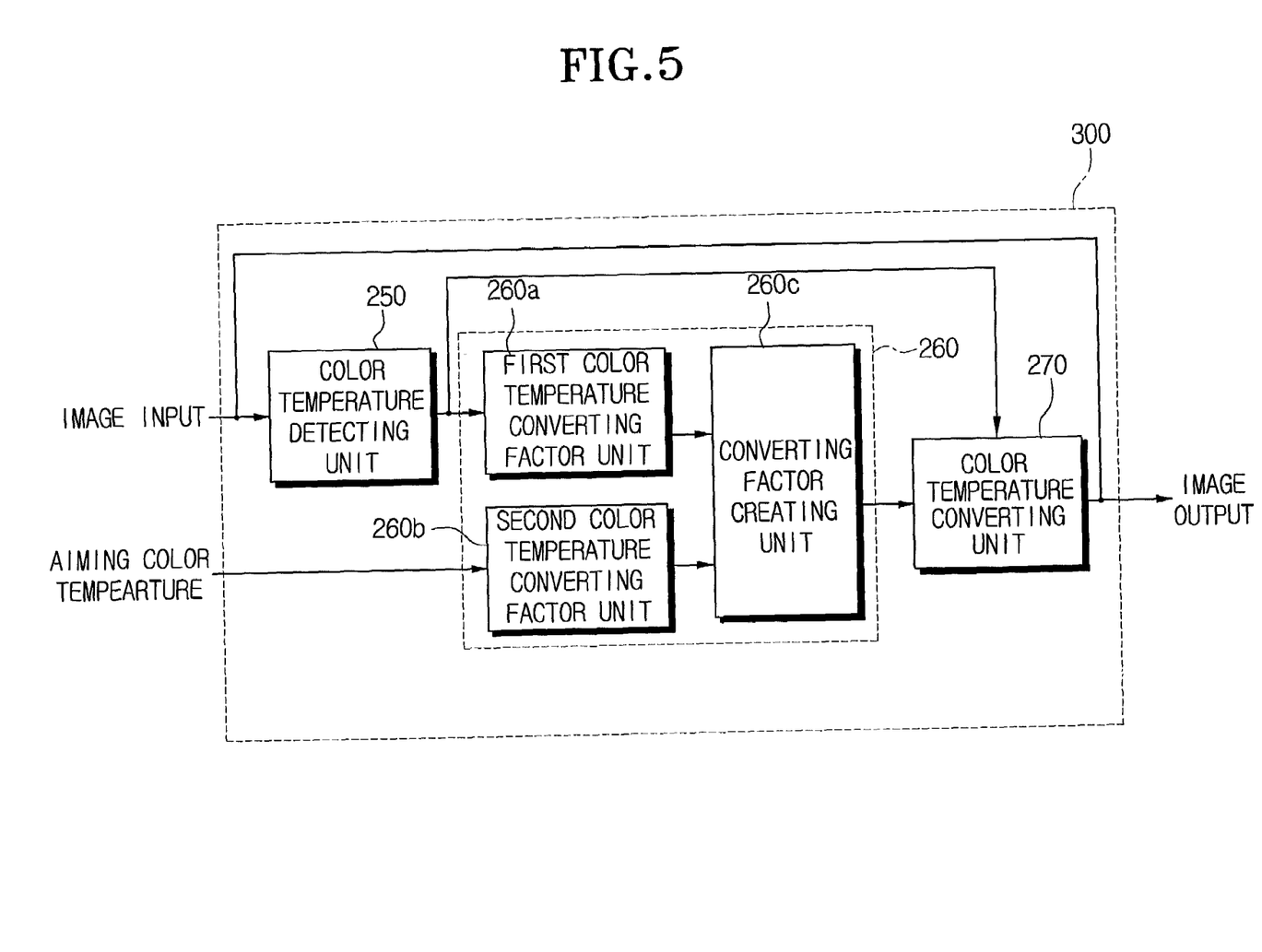
FIG. 5 is a block diagram showing an apparatus for converting color temperature according to the present invention.
Figure 6:
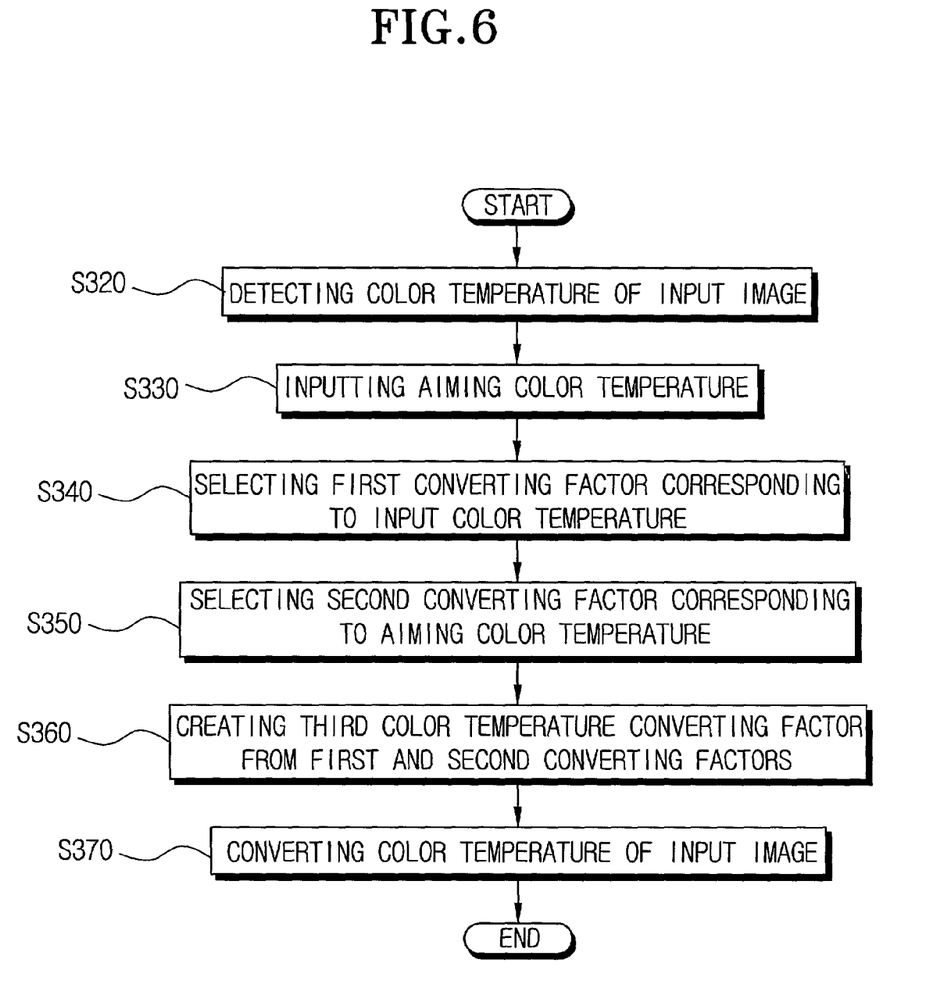
FIG. 6 is a flow chart showing the method of converting a color temperature applied in FIG. 5.

Referring to FIGS. 5 and 6, a color temperature calculating apparatus 300 of a color display system according to the present invention, includes a color temperature detecting unit 250, a color temperature converting factor creating unit 260, and a color temperature converting unit 270. The color temperature detecting unit 250 detects the color temperature of the input image. The color temperature converting factor creating unit 260 creates a converting factor for converting the color temperature of the detected input image to the aiming color temperature. The color temperature converting factor creating unit 260 includes a first color temperature converting factor unit 260a, a second color temperature converting factor unit 260b, and a converting factor creating unit 260c. The first color temperature converting factor unit 260a contains a factor [CS] created in advance for converting the predetermined color temperature to the particular color temperature, and it is in a matrix format. The second color temperature converting factor unit 260b contains a factor [ST] created in advance for converting the particular color temperature to the predetermined color temperature, and it is in a matrix format. The converting factor creating unit 260c creates the third color temperature converting factor [TM] for converting the input color temperature to the aiming color temperature based on the first and the second converting factors according to mathematical expression 7, and it is also in a matrix format.

$$[TM]_{3 \times 3} = [CS]_{3 \times 3} [ST]_{3 \times 3}$$ [Mathematical Expression 7]

The first converting factor is selected from the first color temperature converting factor unit 260a based on the color temperature of the input image. The second converting factor is selected from the second color temperature converting factor unit 260b based on the input aiming color temperature.

The color temperature converting unit 270 converts the color temperature of the input image to the aiming color temperature by using the third color temperature converting factor [TM]. As a result, an image with the converted color temperature is obtained. The image with the converted color temperature can be displayed at the display apparatus.

From now on, the method for converting the color temperature will be described.

First, the color temperature of the input image is detected (S320). The aiming color temperature is input (S330). The first converting factor corresponding to the detected color temperature is selected by the first color temperature converting factor unit 260a (S340). The second converting factor corresponding to the input aiming color temperature is selected by the second color temperature converting factor unit 260b (S350). The third color temperature converting factor for converting the input color temperature to the aiming color temperature is created by multiplying the selected first converting factor and the selected second converting factor (S360). The color temperature of the input image is converted to the aiming color temperature by multiplying the third color temperature converting factor and the input image (S370). When the color temperature of the input image is converted to the aiming color temperature, the aiming color temperature becomes an output image of the color temperature conversion apparatus. The output image with the converted color temperature is displayed on the display unit.

The apparatus and method for converting color temperature according to the present invention can be applied to a general color display system and a method thereof.

According to the apparatus and the method for calculating color temperature of the color display system, since the factors for converting the input color temperature to the aiming color temperature by being mediated by the particular color temperature, are defined in advance, the complexity of the hardware can be reduced. Accordingly, there is an advantage of utility and expansion.

Although the preferred embodiment of the present invention has been described, it will be understood by those skilled in the art that the present invention should not be limited to the described preferred embodiment, but various changes and modifications can be made within the spirit and the scope of the present invention. Accordingly, the scope of the present invention should not be limited to the described preferred embodiment, but various changes and modifications can be made within the spirit and scope of the present invention as defined by the following claims.

What is claimed is:

1. A color temperature conversion method that converts a predetermined input color temperature to a predetermined aiming color temperature by intervening a particular color temperature, the method comprising:

selecting, based on the input color temperature, a first color temperature converting factor from among a plurality of predetermined first color temperature converting factors for converting a first predetermined color temperature to the particular color temperature, wherein each of the predetermined first color temperature converting factors is in the form of a 3×3 matrix;

selecting, based on the input aiming color temperature, a second color temperature converting factor from among a plurality of predetermined second color temperature converting factors for converting the particular color temperature to a second predetermined color temperature, wherein each of the predetermined second color temperature converting factors is in the form of a 3×3 matrix; and multiplying the selected first converting factor and the selected second converting factor to generate a third color temperature converting factor for converting the input color temperature to the aiming color temperature.

2. An apparatus for creating a color temperature converting factor, comprising:

a first color temperature converting factor unit for storing a plurality of first color temperature converting factors for converting a first predetermined color temperature to a particular color temperature;

a second color temperature converting factor unit for storing a plurality of second color temperature converting factors for converting the particular color temperature to a second predetermined color temperature; and a converting factor creating unit that creates a third color temperature converting factor for converting an input color temperature to an aiming color temperature according to a first converting factor selected from the first color temperature converting factors based on the input color temperature, and a second converting factor selected from the second color temperature converting factors based on an input aiming color temperature.

3. An apparatus for converting a color temperature, comprising:
- a color temperature detecting unit for detecting a color temperature from an input image;
- a first color temperature converting factor unit for storing a plurality of first color temperature converting factors for converting a first predetermined color temperature to a particular color temperature;
- a second color temperature converting factor unit for storing a plurality of second color temperature converting factors for converting the particular color temperature to a second predetermined color temperature;
- a color temperature converting factor creating unit that creates a third color temperature converting factor for converting an input color temperature to the aiming color temperature, based on a first converting factor and a second converting factor; and
- a color temperature conversion unit for converting the color temperature of the input image to the aiming color temperature based on the third color temperature converting factor.

4. The apparatus of claim 3, wherein the first converting factor is selected from the first color temperature converting factors based on the detected input color temperature and the second converting factor is selected from the second color temperature converting factors based on the input aiming color temperature.

5. A method for converting a color temperature, comprising the steps of:
- detecting a color temperature from an input image;
- inputting an aiming color temperature;
- selecting a first converting factor corresponding to the detected color temperature, from one or more first color temperature converting factors for converting a first predetermined color temperature to a particular color temperature;
- selecting a second converting factor corresponding to the aiming color temperature, from one or more second color temperature converting factors for converting the particular color temperature to a second predetermined color temperature;
- creating a third color temperature converting factor for converting the color temperature of the input image to the aiming color temperature based on the selected first and second converting factors; and
- converting the color temperature of the input image to the aiming color temperature based on the third color temperature converting factor.

6. A color display system, comprising:
- a color temperature detecting unit for detecting a color temperature from an input image;
- a first color temperature converting factor unit for storing a plurality of first color temperature converting factors for converting a first predetermined color temperature to a particular color temperature;
- a second color temperature converting factor unit for storing a plurality of second color temperature converting factors for converting the particular color temperature to a second predetermined color temperature;
- a color temperature converting factor creating unit for creating a third color temperature converting factor for converting an input color temperature to an aiming color temperature, based on a first converting factor and a second converting factor;
- a color temperature converting unit for converting the color temperature of the input image to the input aiming color temperature based on the third color temperature converting factor; and
- a display unit for displaying the image with the converted color temperature.

7. The color display system of claim 6, wherein the first converting factor is selected from the first color temperature converting factors based on the detected color temperature and the second converting factor is selected from the second color temperature converting factors based on the input aiming color temperature.

8. A color display method, comprising the steps of:
- detecting a color temperature from an input image;
- inputting an aiming color temperature;
- selecting a first converting factor corresponding to the detected color temperature from one or more first color temperature converting factors, for converting a first predetermined color temperature to a particular color temperature;
- selecting a second converting factor corresponding to the aiming color temperature from one or more second color temperature converting factors, for converting the particular color temperature to a second predetermined color temperature;
- creating a third color temperature converting factor for converting the color temperature of the input image to the aiming color temperature based on the selected first and second converting factors;
- converting the color temperature of the input image to the aiming color temperature, based on the third color temperature converting factor; and
- displaying the image with the converted color temperature.

* * * * *